US006352346B1

(12) United States Patent
Kasai

(10) Patent No.: US 6,352,346 B1
(45) Date of Patent: Mar. 5, 2002

(54) IMAGE FORMING OPTICAL SYSTEM EMPLOYING A REFLECTIVE TYPE SPATIAL LIGHT MODULATOR

(75) Inventor: Ichiro Kasai, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/533,370

(22) Filed: Mar. 22, 2000

(30) Foreign Application Priority Data

Mar. 23, 1999 (JP) ............................................ 11-077045

(51) Int. Cl.⁷ ............................................... G03B 21/28
(52) U.S. Cl. .......................................... 353/98; 359/629
(58) Field of Search .............................. 353/81, 31, 98, 353/69, 38; 359/629, 630; 348/742, 743, 771

(56) References Cited

U.S. PATENT DOCUMENTS

| 21,068 A | * | 8/1858 | Togino et al. | ............... | 359/630 |
|---|---|---|---|---|---|
| 3,790,267 A | * | 2/1974 | Ramberg | ..................... | 353/70 |
| 5,604,624 A | * | 2/1997 | Magarill | ....................... | 353/81 |
| 5,991,084 A | * | 11/1999 | Hildebrand et al. | ........ | 353/629 |

FOREIGN PATENT DOCUMENTS

| JP | 08179400 | 7/1996 |
|---|---|---|
| JP | 09096867 | 4/1997 |
| WO | WO97/45768 | 12/1997 |

* cited by examiner

*Primary Examiner*—William Dowling
(74) *Attorney, Agent, or Firm*—Burns, Doane, Swecker & Mathis, LLP

(57) ABSTRACT

An image forming optical system has an illumination light source for forming an illumination light beam, a reflective type image forming device for optically modulating the illumination light beam into an image-carrying light beam, a light beam selecting surface for selectively reflecting or transmitting a light beam shone thereon according to the angle of incidence thereof, and deflecting means disposed between the light beam selecting surface and the reflective type image forming device. One of the illumination light beam and the image-carrying light beam is shone on the light beam selecting surface at an angle of incidence larger than the critical angle so as to be reflected therefrom, and the other is shone on the light beam selecting surface at an angle of incidence smaller than the critical angle so as to be transmitted therethrough, so that these two light beams are separated. The above-mentioned angles of incidence are set appropriately by the deflecting means.

16 Claims, 7 Drawing Sheets

IMAGE FORMING OPTICAL SYSTEM EMPLOYING A REFLECTIVE TYPE SPATIAL LIGHT MODULATOR

This application is based on application No. H11-077045 filed in Japan on Mar. 23, 1999, the entire content of which is hereby incorporated by reference.

BACKGROUND OF THE INVENTION

1. Field of the Invention

The present invention relates to an image forming optical system that forms an image-carrying light beam by illuminating a reflective type spatial light modulator. The present invention relates also to an observation apparatus or projection apparatus employing such an image forming optical system.

2. Description of the Prior Art

In recent years, reflective type spatial light modulators such as reflective type liquid crystal devices have been receiving much attention. This is because their relatively high aperture ratios offer bright images and allow high-speed modulation. More specifically, on a liquid crystal device, circuits need to be formed to control the individual pixels thereof, and these circuits occupy a certain area on the liquid crystal device. Whereas, in a transmissive type liquid crystal device, the presence of those circuits inevitably reduces the aperture ratio, in a reflective type liquid crystal device, those circuits can be formed on the face of the device opposite to the face thereof from which an image-carrying light beam exits, and thus their presence does not reduce the aperture ratio. This permits reflective type liquid crystal devices to offer brighter images.

Accordingly, as compared with a transmissive type liquid crystal device having an identical number of pixels, a reflective type liquid crystal device can be made smaller without sacrificing brightness. To put it another way, as compared with a transmissive type liquid crystal device of an identical size, a reflective type liquid crystal device can be provided with more pixels so as to offer higher resolution. Thus, by the use of a reflective type spatial light modulator having these advantages, it is possible to form images with satisfactory brightness and resolution.

In a reflective type spatial light modulator, an image-carrying light beam exits from the same face of the device as that on which an illumination light beam is shone. Therefore, here, it is essential to separate the image-carrying light beam from the illumination light beam in some way. How these two light beams are separated in conventional arrangements will be described below, taking up three conventional image forming optical systems as Conventional Examples 1 to 3.

FIG. 7A schematically shows the overall construction of the image forming optical system of Conventional Example 1. In Conventional Example 1, a semitransparent surface 102 is disposed in front of a reflective type spatial light modulator 101. Here, the illumination light beam 103 (indicated by a solid line) is transmitted through the semitransparent surface 102 so as to be shone on the reflective type modulator 101, and the image-carrying light beam 104 (indicated by a dash-and-dot line) resulting from the illumination light beam being modulated thereby is reflected from the semitransparent surface 102 and is thereby separated from the illumination light beam 103. Alternatively, as shown in FIG. 7B, it is also possible to separate the illumination light beam 103 and the image-carrying light beam 104 by letting the semitransparent surface 102 reflect the former and transmit the latter.

FIG. 8 shows the overall construction of Conventional Example 2. In Conventional Example 2, a quarter-wave plate 109 is disposed in front of a reflective type modulator 101 to perform polarization conversion on the illumination light beam 106 and the image-carrying light beam 108, and a polarization selection surface 105 is used to separate the two light beams. Here, the illumination light beam 106 transmitted through the polarization selection surface 105 is, after being subjected to polarization conversion performed by the quarter-wave plate 109, reflected from the polarization selection surface 105. This helps minimize the loss of light. For example, in a case where the polarization selection surface 105 is so designed as to transmit only P-polarized light, only the P-polarized light component of the illumination light beam 106 is transmitted through the polarization selection surface 105 so as to be shone on the reflective type modulator 101, and the image-carrying light beam 108, which has been so converted as to include only S-polarized light, is reflected from the polarization selection surface 105 and is thereby separated from the illumination light beam 106.

In Conventional Example 3, one half of the pupil of a projection optical system is used by the illumination light beam and the other half thereof is used by the image-carrying light beam that is to be projected. This helps eliminate the loss of the illumination light beam. An optical system of this type is disclosed, for example, in Japanese Laid-Open Patent Application No. H9-96867.

However, in Conventional Example 1, before the image-carrying light beam is separated from the illumination light beam, it needs to have passed through the semitransparent surface twice. Thus, if it is assumed that the semitransparent surface transmits 50% of the light incident thereon, as little as 25%, i.e. our fourth, of the illumination light beam can be used as the image-carrying light beam. In particular, in a case where a liquid crystal device is used as the reflective type modulator, a light beam polarized in a particular direction needs to be shone thereon as the illumination light beam, and this aggravates the loss of light.

In Conventional Example 2, the loss of light is smaller than in Conventional Example 1. However, here, the polarization selection surface cannot be realized without the use of an optical element such as a PBS mirror or PBS block that exhibits incident-angle dependence. Specifically, the illumination light beam shone on the polarization selection surface includes rays that are incident thereon at various angles of incidence, and, of these rays, those whose angles of incidence have not been optimized hamper proper polarization selection and thus hamper proper separation of light to be transmitted and light to be reflected. This not only requires that the angle of incidence of the illumination light beam be controlled within a considerably narrow margin, but also leads to an unduly large loss of light or causes undesirable stray light to appear. Moreover, a PBS mirror, PBS block, or the like requires the formation of a PBS film, and is thus expensive. In particular, in a case where a high-precision PBS block is required, it needs to be formed by cementing a plurality of blocks together, and is thus troublesome and expensive to produce.

In Conventional Example 3, the optical system for projecting the image-carrying light beam needs to have a large pupil. This makes it difficult to secure satisfactory optical performance, and makes the optical system as a whole larger.

SUMMARY OF THE INVENTION

An object of the present invention is to provide a simple and inexpensive image forming optical system that is so designed as to waste as little light as possible and that is so constructed as to help the observation apparatus or projection apparatus into which it is incorporated to be made more compact.

To achieve the above object, according to one aspect of the present invention, an optical apparatus is provided with: a reflective type spatial light modulator for modulating an incoming light beam shone into the optical apparatus by selectively reflecting the incoming light beam; a light beam selecting surface for selectively reflecting the incoming light beam according to the angle of incidence at which the incoming light beam strikes the light beam selecting surface; and deflecting means disposed between the reflective type spatial light modulator and the light beam selecting surface so as to deflect at least one of the incoming light beam and the reflected light beam reflected from the reflective type spatial light modulator. Here, the incoming light beam is reflected from or transmitted through the light beam selecting surface so as to be shone, through the deflecting means, on the reflective type spatial light modulator, and is then selectively reflected by the reflective type spatial light modulator so as to be modulated into the reflected light beam, which is then shone, through the deflecting means again, on the light beam selecting surface so as to be transmitted therethrough or reflected therefrom according to whether the incoming light has been reflected therefrom or transmitted therefrom, respectively.

According to another aspect of the present invention, an image forming apparatus is provided with: an illumination light source for emitting an illumination light beam; a reflective type spatial light modulator for selectively reflecting the illumination light beam so as to modulate the illumination light beam into an image-carrying light beam; a light beam selecting surface for selectively reflecting the illumination light beam according to the angle of incidence at which the illumination light beam strikes the light beam selecting surface; and deflecting means disposed between the reflective type spatial light modulator and the light beam selecting surface so as to deflect at least one of the illumination light beam and the image-carrying light beam. Here, the illumination light beam is reflected from or transmitted through the light beam selecting surface so as to be shone, through the deflecting means, on the reflective type spatial light modulator, and is then selectively reflected by the reflective type spatial light modulator so as to be modulated into the image-carrying light beam, which is then shone, through the deflecting means again, on the light beam selecting surface so as to be transmitted therethrough or reflected therefrom according to whether the illumination light has been reflected therefrom or transmitted therefrom, respectively.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, embodiments of the present invention will be described with reference to the accompanying drawings. First, the principle of the present invention will be described through a description of the image forming optical system of a first embodiment of the invention.

<First Embodiment>

Figure 1:
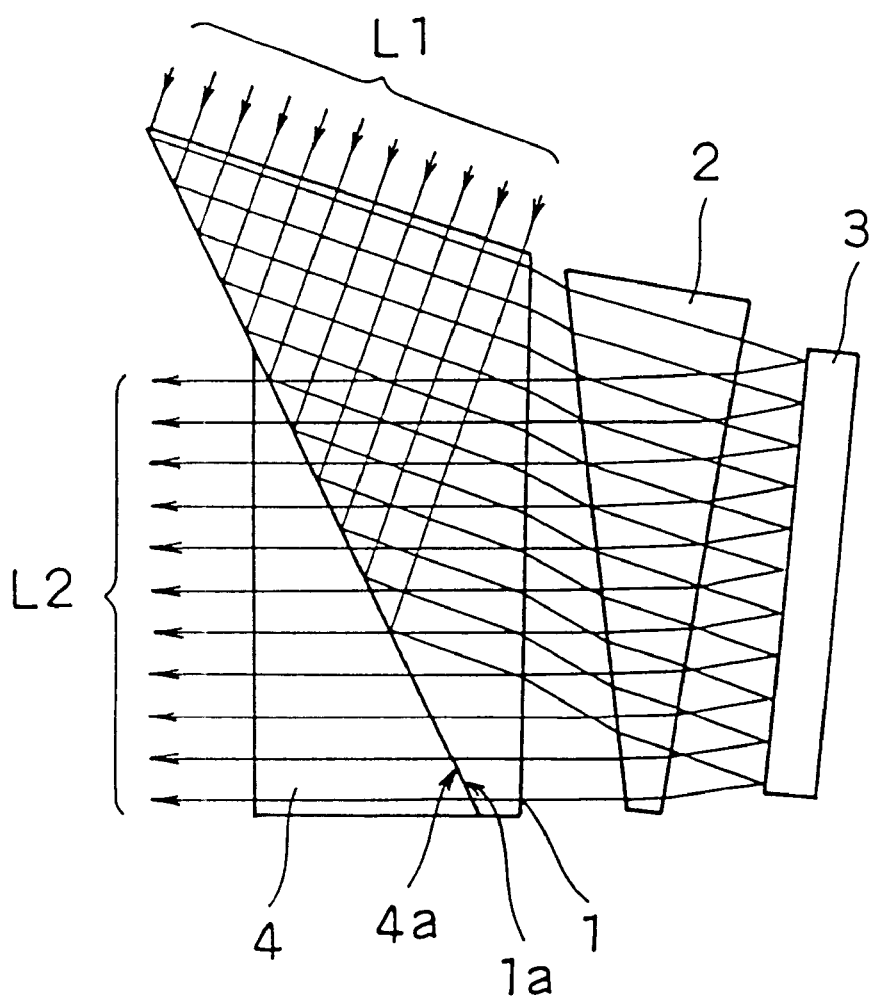
FIG. 1 is a diagram showing the overall construction of the image forming optical system of a first embodiment of the invention.

FIG. 1 shows the overall construction of an image forming optical system of the first embodiment. The image forming optical system of this embodiment consists essentially of an illumination light source (not shown), a light beam selecting surface 1a, a wedge prism 2 serving as a deflecting means, and a liquid crystal device 3 serving as a reflective type modulator. The light beam selecting surface 1a exploits the back-surface reflection of the prism 1.

In FIG. 1, an illumination light beam L1 emitted from the illumination light source (not shown) is shone on the light beam selecting surface 1a. This light beam selecting surface 1a is so arranged that the illumination light beam L1 strikes it at an angle of incidence larger than the critical angle so that the illumination light beam L1 will be totally reflected therefrom. The illumination light beam L1 reflected from the light beam selecting surface 1a is shone, through the wedge prism 2, on the liquid crystal device 3. The liquid crystal device 3 optically modulates the illumination light beam L1 to form an image-carrying light beam L2. The image-carrying light beam L2 exiting from the liquid crystal device 3 is then shone, through the wedge prism 2, on the light beam selecting surface 1a, and is transmitted therethrough and thereby separated from the illumination light beam L1.

The wedge prism 2, by its deflecting action, deflects both the illumination light beam L1 and the image-carrying light beam L2 in such a way that those light beams exit from the wedge prism 2 at angles of emergence different from the angles of incidence at which they struck it. This deflecting action serves to deflect those light beams in such a way that the illumination light beam L1 strikes the liquid crystal device 3 at a desired angle of incidence and the image-carrying light beam L2 strikes the light beam selecting surface 1a at an angle of incidence smaller than the critical angle. Moreover, in a case where the image-carrying light beam L2 is fed further to a succeeding optical system, the deflecting action of the wedge prism 2 may be so adjusted that the image-carrying light beam L2 enters the succeeding optical system at a desired angle of incidence. This helps make the entire optical system including the succeeding optical system compact and, in particular in a case where the image-carrying light beam is projected, obtain high-quality projection images.

By the use of a deflecting means having a deflecting action as described above, even if the light beam selecting surface and the liquid crystal device are arranged parallel to each other, it is possible to secure a difference between the angles of incidence at which the illumination light beam and the image-carrying light beam strike the light beam selecting surface, and thus it is possible to separate those two light beams. It is to be noted that, in all of the embodiments described hereafter, a deflecting means is employed that has a deflecting action as described above.

Moreover, in this embodiment, a prism 4 is additionally provided that has a surface 4a arranged parallel to the light beam selecting surface 1a with a very small gap secured in between. This prism 4 serves to cancel the deflection that occurs in the light beam passing through the light beam selecting surface 1a, and thus helps prevent the image-carrying light beam L2 from being affected by the light beam selecting surface 1a.

As described above, in this embodiment, separation of the illumination light beam and the image-carrying light beam is achieved by the light beam selecting surface, which simply exploits the back-surface reflection of a prism, and thus without any need for a special coating. This makes it possible to realize a simple and inexpensive image forming optical system. Moreover, the light beam selecting surface reflects all rays that strike it at angles of incidence larger than the critical angle and transmits all rays that strike it at angles of incidence smaller than the critical angle. Accordingly, the light beam selecting surface is free from incident-angle dependence, and can thus be designed to allow all rays to travel along desired paths. Furthermore, by appropriately adjusting the deflecting action of the deflecting means, it is possible to extract the image-carrying light beam in a desired manner. This helps minimize the restrictions that are imposed on the design of the succeeding optical system; for example, the image-carrying light beam no longer have to be fed to a large-size optical system, and therefore the apparatus as a whole can be made compact.

The illumination light beam shone on the liquid crystal device 3 needs to be polarized in a particular direction, and therefore it needs to be provided with, although not shown in the figure, a polarization converter or some other means for extracting light polarized in a particular direction. It is to be noted that this means is omitted also in the drawings of the embodiments described hereafter.

<Second Embodiment>

Figure 2:
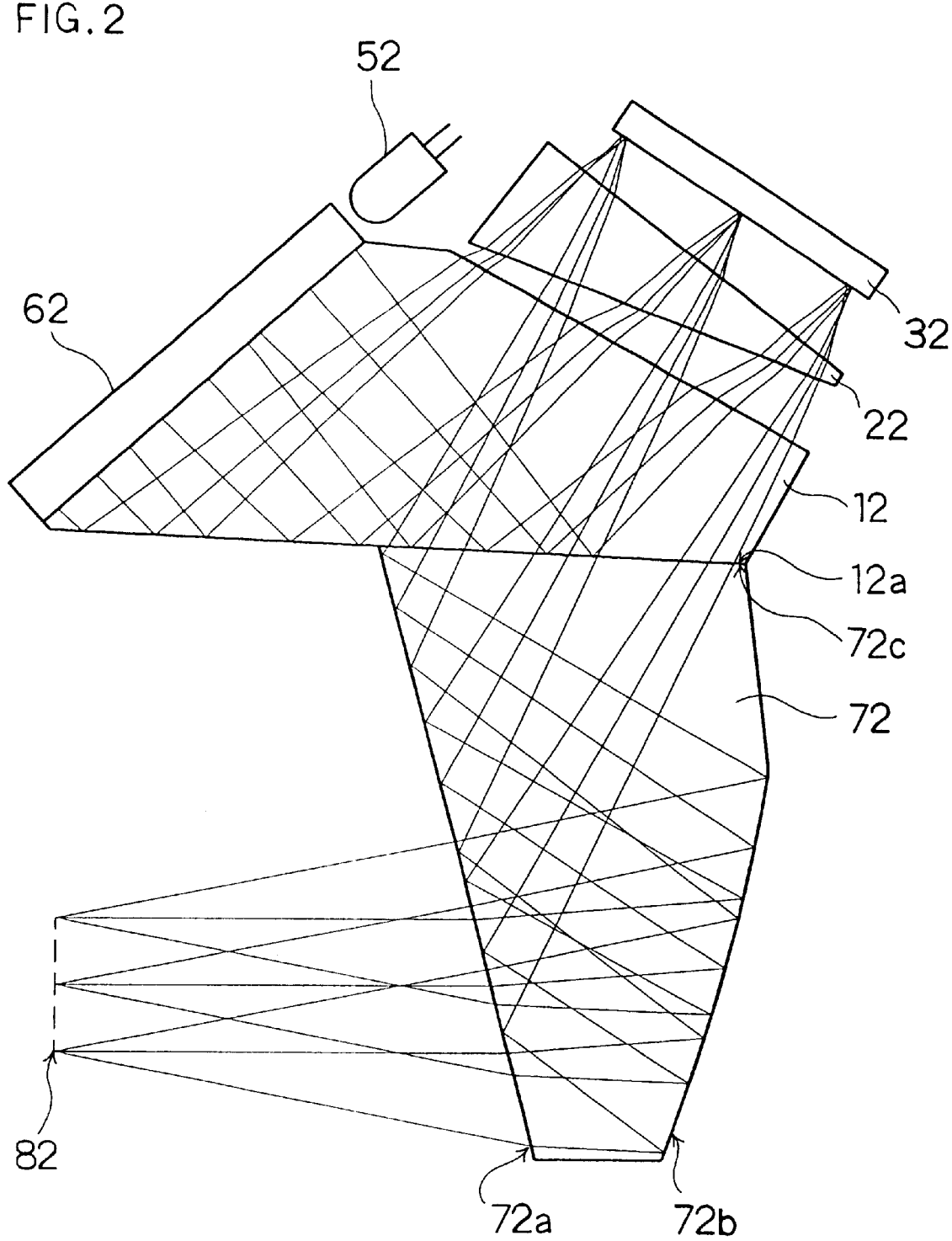
FIG. 2 is a diagram showing the overall construction of the observation apparatus of a second embodiment of the invention.

FIG. 2 shows the overall construction of the observation apparatus of a second embodiment of the invention. The observation apparatus of this embodiment includes an image forming optical system embodying the invention, which consists essentially of an illumination light source 52, a light beam selecting surface 12a exploiting the back-surface refection of a prism 12, a wedge prism 22 serving as a deflecting means, and a liquid crystal device 32 serving as a reflective type modulator. In this embodiment, the light emitted from the light source 52 is shone into a light guide plate 62 so as to be enlarged to have a desired cross-sectional area, and is then shone, as an illumination light beam, into the prism 12. How the illumination light beam then travels from the light beam selecting surface 12a of the prism 12 to the liquid crystal device 32 and then therefrom back to the light beam selecting surface 12a is the same as in the image forming optical system of the first embodiment, and therefore overlapping descriptions will be omitted.

After being separated from the illumination light beam by the light beam selecting surface 12a, the image-carrying light beam is shone into a prism 72 constituting an observation optical system, and is then directed to the pupil 82 of an observer so as to be observed as an enlarged image. The observation optical system is designed as follows. The prism 72 has a surface 72c arranged parallel to the light beam selecting surface 12a with a very small gap in between, and thus serves to cancel the deflection that occurs in the image-carrying light beam passing through the light beam selecting surface 12a. The prism 72 further has a surface 72a and a reflective concave surface 72b. The image-carrying light beam shone into the prism 72 strikes the face 72a at an angle of incidence larger than the critical angle, and is thus totally reflected therefrom. The image-carrying light beam is then reflected from the concave surface 72b, then strikes the surface 72a at an angle of incidence smaller than the critical angle, and is thus transmitted therethrough so as to be directed to the pupil 82 of the observer.

In the observation apparatus of this embodiment, the image-carrying light beam can be extracted from the image forming optical system in such a way as to travel in a desired direction that suits the observation optical system actually used. This helps make the apparatus as a whole compact and obtain high-quality observation images. Moreover, as described in connection with the first embodiment, it is possible to realize an inexpensive and simple image forming optical system, and therefore it is possible to realize an inexpensive and simple observation apparatus as a whole.

<Third Embodiment>

Figure 3:
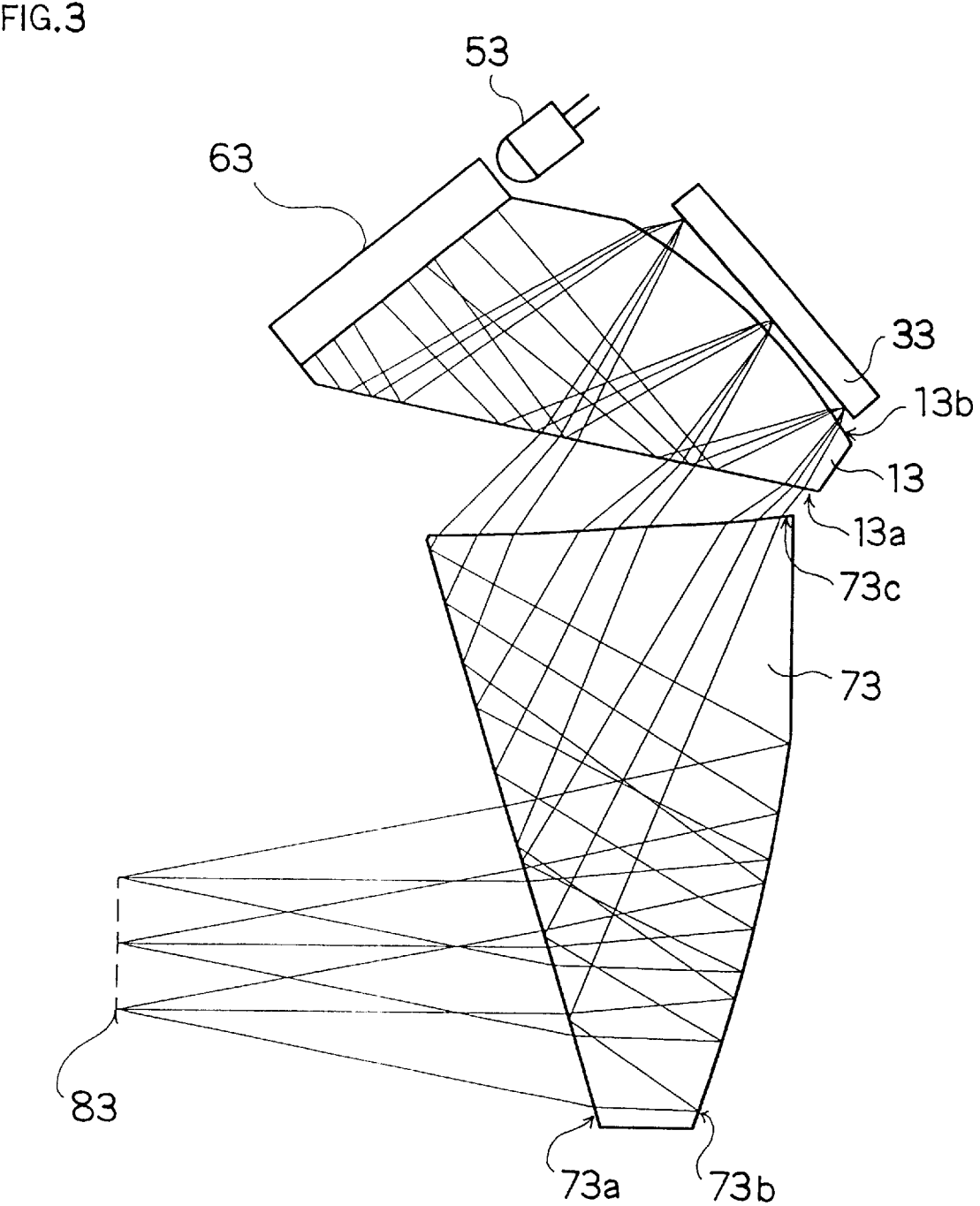
FIG. 3 is a diagram showing the overall construction of the observation apparatus of a third embodiment of the invention.

FIG. 3 shows the overall construction of the observation apparatus of a third embodiment of the invention. The observation apparatus of this embodiment includes an image forming optical system embodying the invention, which consists essentially of an illumination light source 53, a light beam selecting surface 13a exploiting the back-surface reflection of a prism 13, a deflecting surface 13b exploiting an end surface of the prism 13 that is formed into a convex surface, and a liquid crystal device 33 serving as a reflective type modulator. In this embodiment, the light emitted from the light source 53 is shone into a light guide plate 63 so as to be enlarged to have a desired cross-sectional area, and is then shone, as an illumination light beam, into the prism 13. How the illumination light beam then travels from the light beam selecting surface 13a of the prism 13 to the liquid crystal device 33 and then therefrom back to the light beam selecting surface 13a is the same as in the image forming optical system of the first embodiment.

In this embodiment, the deflecting surface 13b has a positive optical power. This makes it possible to reduce the cross-sectional area of the illumination light beam exiting from the light guide plate 63, and thus helps achieve miniaturization. Moreover, this deflecting surface 13b serves also to deflect the illumination light beam in such a way that the illumination light beam strikes the liquid crystal device 33 at uniform angles of incidence all over the surface thereof.

After being separated from the illumination light beam by the light beam selecting surface 13a, the image-carrying light beam is shone into a prism 73 constituting an observation optical system, and is then directed to the pupil 83 of an observer so as to be observed as an enlarged image. The observation optical system is designed as follows. The prism 73 has a surface 73c arranged parallel to the light beam selecting surface 13a with a gap in between, and receives the image-carrying light beam through this surface 73c. The prism 73 further has a surface 73a and a reflective concave surface 73b. The image-carrying light beam shone into the prism 73 strikes the face 73a at an angle of incidence larger than the critical angle, and is thus totally reflected therefrom.

The image-carrying light beam is then reflected from the concave surface 73b, then strikes the surface 73a at an angle of incidence smaller than the critical angle, and is thus transmitted therethrough so as to be directed to the pupil 83 of the observer.

The observation apparatus of this embodiment offers the same advantages as that of the second embodiment. In addition, here, giving an optical power to the deflecting surface makes it possible to achieve further miniaturization of the image forming optical system.

<Fourth Embodiment>

Figure 4:
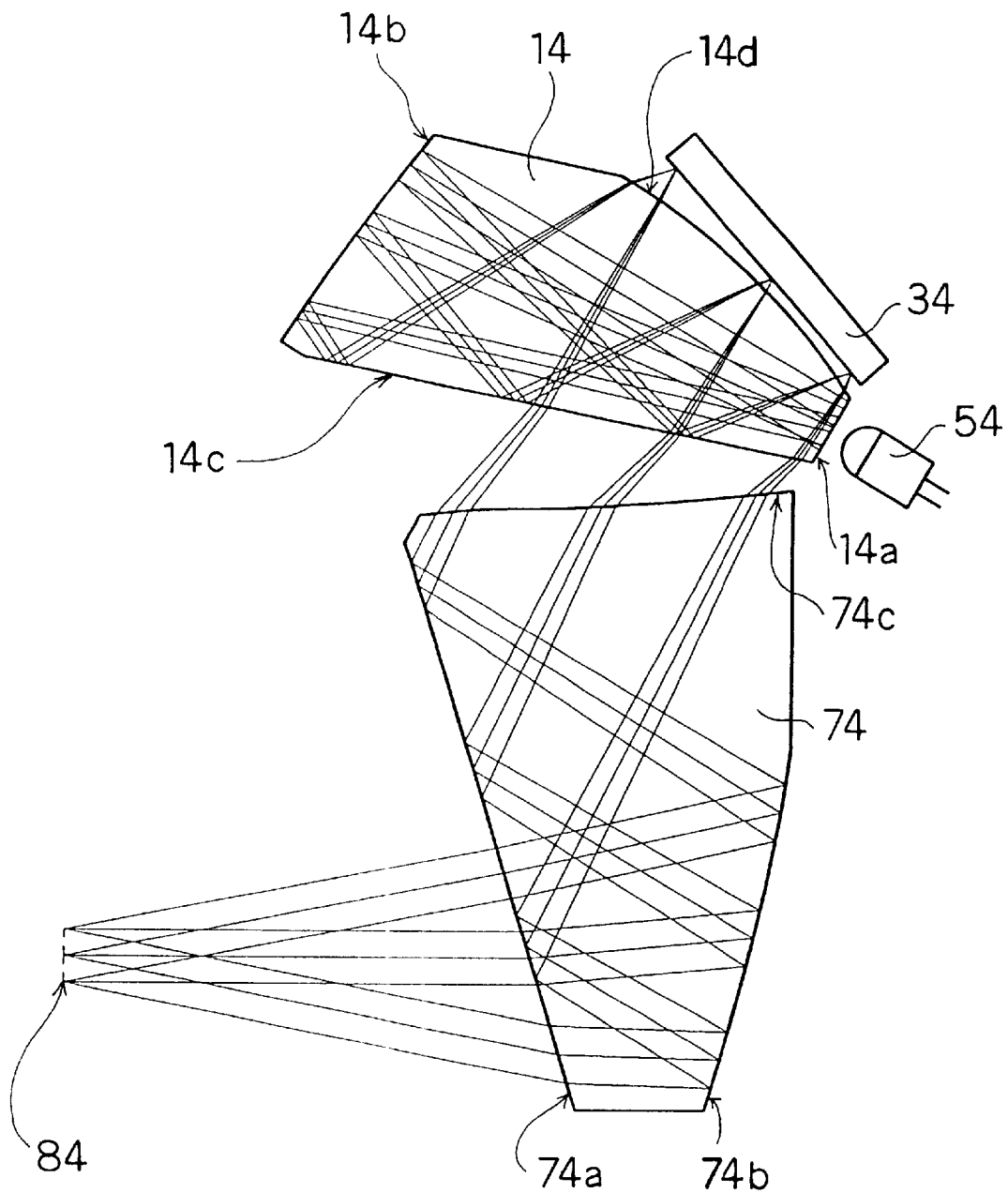
FIG. 4 is a diagram showing the overall construction of the observation apparatus of a fourth embodiment of the invention.

FIG. 4 shows the overall construction of the observation apparatus of a fourth embodiment of the invention. The observation apparatus of this embodiment includes an image forming optical system embodying the invention, which consists essentially of an illumination light source 54, a light beam selecting surface 14c exploiting the back-surface reflection of a prism 14, a deflecting surface 14d exploiting an end surface of the prism 14 that is formed into a curved surface, and a reflective type modulator employing a liquid crystal device 34. In this embodiment, the light emitted from the light source 54 enters the prism 14 through its end surface 14a, is then reflected from the concave reflecting surface 14b and then from the light beam selecting surface 14c, and is then shone, through the deflecting surface 14d, on the liquid crystal device 34. The liquid crystal device 34 optically modulates this light beam to form therefrom an image-carrying light beam, which is then shone through the deflecting surface 14d on the light beam selecting surface 14c.

In this embodiment, the concave reflecting surface 14b and the deflecting surface 14d have positive optical powers such that the illuminated surface 14a and the pupil 84 of an observer are conjugate with respect to each other. This makes it possible to reduce the illuminated surface 14a, and thus contributes to miniaturization of the apparatus as a whole. Furthermore, the deflecting surface 14d exerts a deflecting action that deflects the illumination light beam in such a way that it strikes the liquid crystal device 34 at uniform angles of incidence all over the surface thereof.

After being separated from the illumination light beam by the light beam selecting surface 14c, the image-carrying light beam is shone into a prism 74 constituting an observation optical system. How this light beam then travels in the observation optical system is the same as in the third embodiment, and therefore overlapping descriptions will not be repeated.

The observation apparatus of this embodiment offers the same advantages as that of the second embodiment. In addition, here, giving optical powers to the deflecting surface and the reflecting surface makes it possible to achieve further miniaturization of the image forming optical system.

<Fifth Embodiment>

Figure 5:
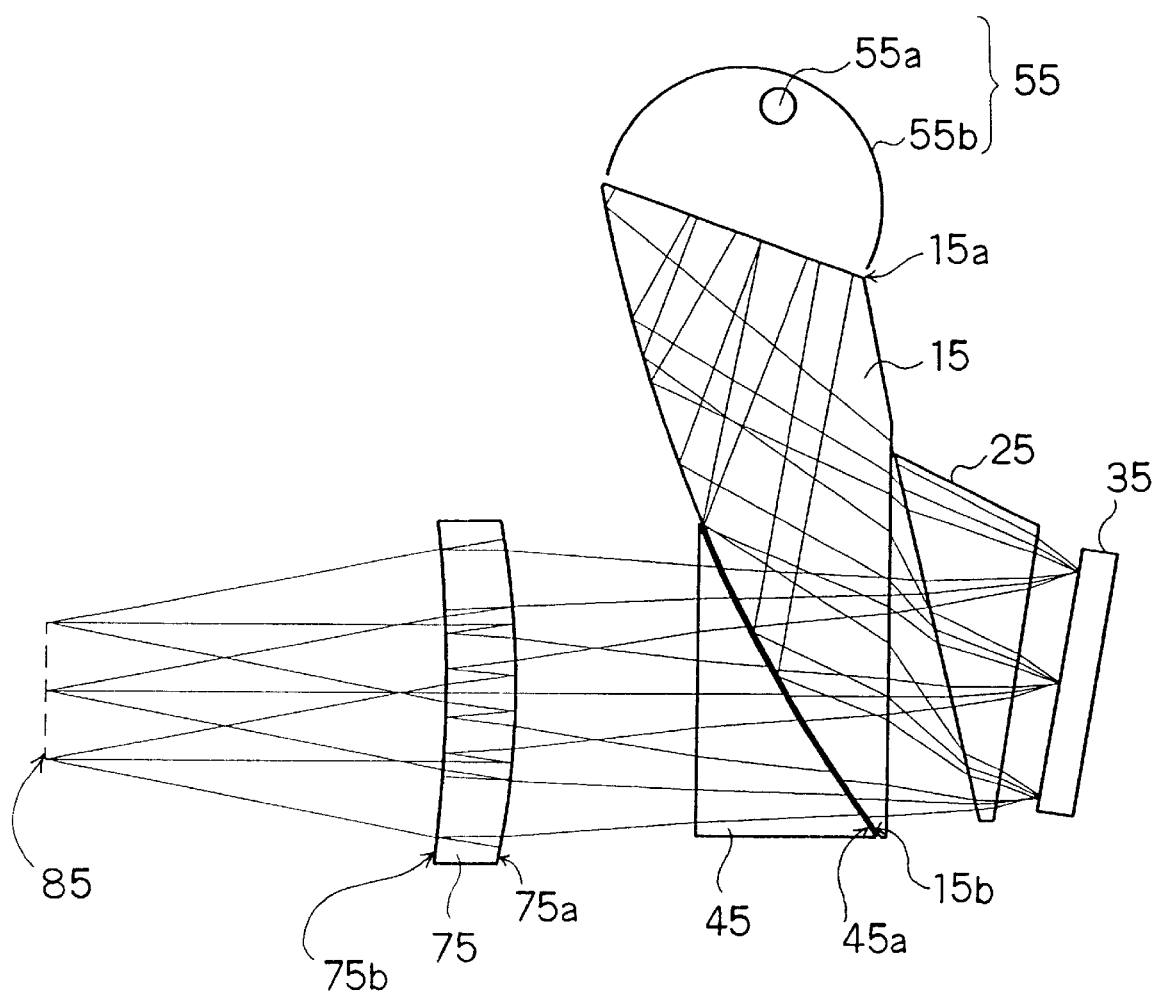
FIG. 5 is a diagram showing the overall construction of the observation apparatus of a fifth embodiment of the invention.

FIG. 5 shows the overall construction of the observation apparatus of a fifth embodiment of the invention. The observation apparatus of this embodiment includes an image forming optical system embodying the invention, which consists essentially of an illumination light source 55 composed of a light emitter 55a and a reflector 55b, a light beam selecting surface 15b exploiting the back-surface reflection of a prism 15, a wedge prism 25 serving as a deflecting means, and a liquid crystal device 35 serving as a reflective type modulator. In this embodiment, the light emitted from the light source 55 enters the prism 15 through its end surface 15a, is then reflected from the light beam selecting surface 15b, and is then shone, through the wedge prism 25, on the liquid crystal device 35. The liquid crystal device 35 optically modulates this light beam to form therefrom an image-carrying light beam, which is then shone through the deflecting wedge prism 25 on the light beam selecting surface 15b again. How the light beam travels here is the same as in the first embodiment, and therefore overlapping descriptions will not be repeated.

In this embodiment, the light beam selecting surface 15b is formed into a curved surface having a positive optical power. This makes it possible to reduce the illuminated surface 15a, and thus contributes to miniaturization of the apparatus as a whole.

After being separated from the illumination light beam by the light beam selecting surface 15b, the image-carrying light beam is shone through a prism 45 into an observation optical system 75, and is then directed to the pupil 85 so as to be observed as an enlarged image. The prism 45 has a curved surface 45a that has an identical shape with the light beam selecting surface 15b so as to be arranged to face it with a very small gap in between, and thus serves to cancel the deflection that occurs in the image-carrying light beam passing through the light beam selecting surface 15b.

The surface 75a of the observation optical system 75 that faces the prism 45 is formed into a half mirror having a convex surface. The surface 75b at the other end of the observation optical system 75 is formed into a concave surface, which has a cholesteric liquid crystal layer provided thereon and is thereby formed into a selective reflecting surface. One half of the light beam directed to the observation optical system 75 is transmitted through the surface 75a, and then, as a somewhat convergent beam, strikes the surface 75b. This light beam is then reflected from the surface 75b so as to strike the surface 75a again, and one half of this light beam is reflected therefrom. The light reflected from the surface 75a is, as a more convergent light beam, transmitted through the surface 75b, and is then directed to the pupil 85 of an observer.

In this embodiment, the observation optical system 75 is built as a centered optical system, and thus suffers little from aberrations such as result from decentering. Accordingly, it is possible to achieve high optical performance in the observation optical system 75, and thus it is possible to observe high-resolution images covering a wide angle of view. Moreover, this embodiment offers the same advantages as the second embodiment.

Figure 6:
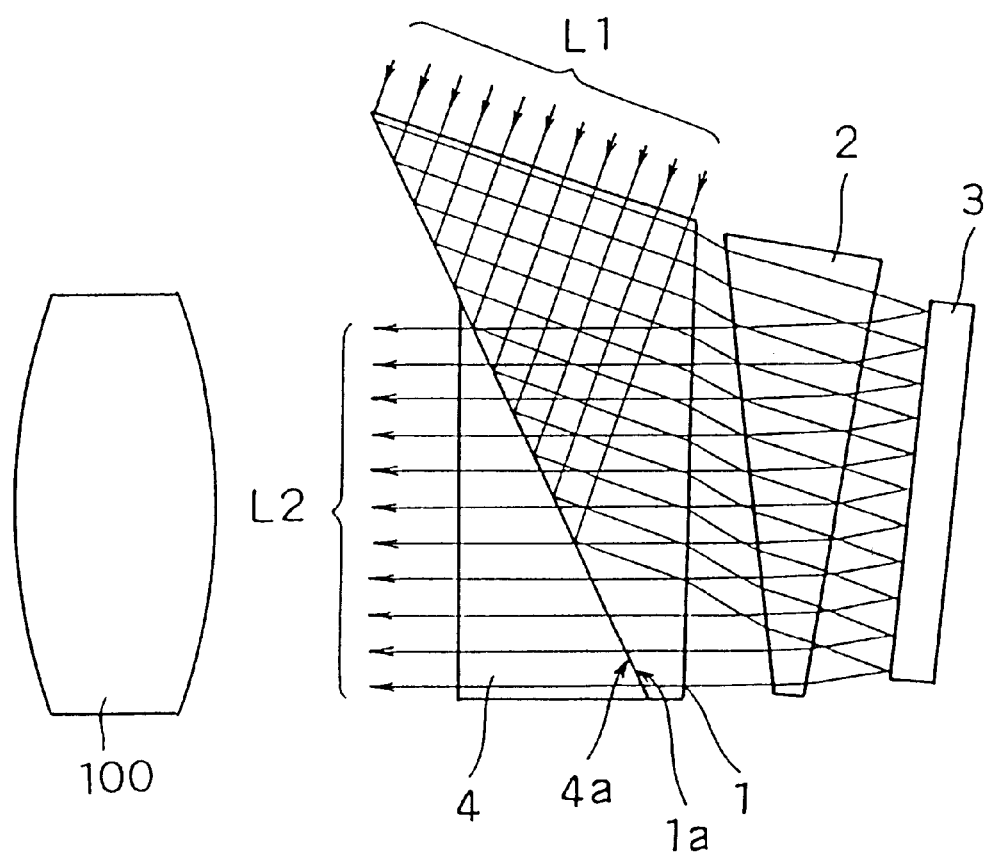
FIG. 6 is a diagram showing the overall construction of an image projection apparatus adopting the image forming optical system of the first embodiment.
Figure 7A:
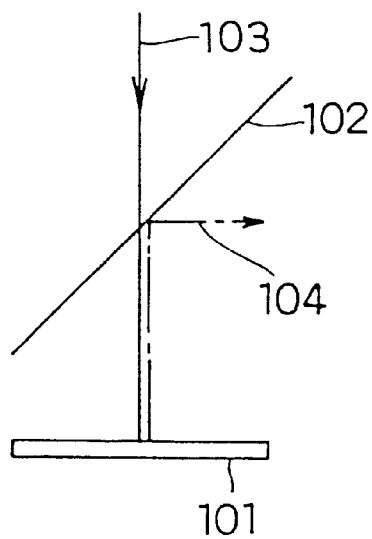
FIGS. 7A and 7B are diagrams schematically showing the overall construction of the image forming optical system of Conventional Example 1.
Figure 7B:
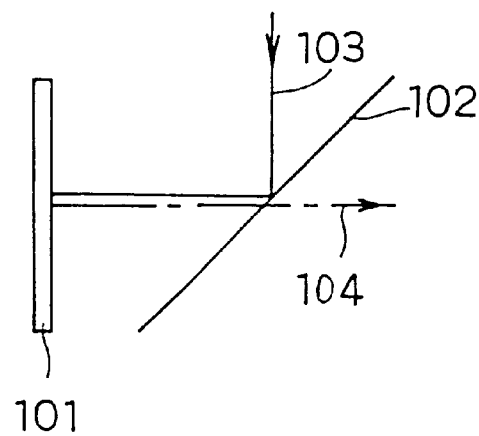
Figure 8:
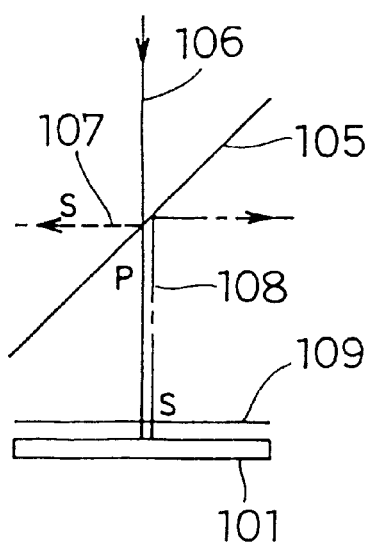
FIG. 8 is a diagram schematically showing the overall construction of the image forming optical system of Conventional Example 2.

Although the second to fifth embodiments described above deal with observation apparatuses in which the image-carrying light beam formed by an image forming optical system embodying the present invention is directed to an observation optical system, it is also possible, as shown in FIG. 6, to realize projection apparatuses in which the image-carrying light beam is directed to a projection optical system 100. Also in such cases, the image-carrying light beam can be extracted from the image forming optical system in such a way as to travel in a desired direction that suits the projection optical system actually used. Thus, it is possible to make the apparatus as a whole compact, and obtain high-quality projection images. Moreover, as described earlier in connection with the first embodiment, it is possible to realize an inexpensive and simple image forming optical system, and therefore it is possible to realize an inexpensive and simple observation apparatus as a whole.

Moreover, although the embodiments described above deal with cases where a wedge prism or a deflecting surface of a prism is used as a deflecting means, it is possible to use any other means to achieve similar deflection of light, for example a diffractive element such as a grating or a hologram. A diffractive element can be formed as a thin, flat surface, and thus contributes to further miniaturization as compared with a wedge prism.

Obviously, many modifications and variations of the present invention are possible in light of the above teachings. It is therefore to be understood that within the scope of the appended claims, the invention may be practiced other than as specifically described.

What is claimed is:

1. An optical apparatus comprising:
   a reflective type spatial light modulator for modulating an incoming light beam shone into the optical apparatus by selectively reflecting the incoming light beam;
   a light beam selecting surface for selectively reflecting the incoming light beam according to an angle of incidence at which the incoming light beam strikes the light beam selecting surface; and
   deflecting means disposed between the reflective type spatial light modulator and the light beam selecting surface so as to deflect at least one of the incoming light beam and a reflected light beam reflected from the reflective type spatial light modulator,
      wherein the incoming light beam is reflected from or transmitted through the light beam selecting surface so as to be shone, through the deflecting means, on the reflective type spatial light modulator, and is then selectively reflected by the reflective type spatial light modulator so as to be modulated into the reflected light beam, which is then shone, through the deflecting means again, on the light beam selecting surface so as to be transmitted therethrough or reflected therefrom according to whether the incoming light has been reflected therefrom or transmitted therefrom, respectively.

2. An optical apparatus as claimed in claim 1, wherein the deflecting means has a positive optical power.

3. An optical apparatus as claimed in claim 1, wherein the light beam selecting surface acts on both the incoming light beam and the reflected light beam.

4. An optical apparatus as claimed in claim 1, wherein the deflecting means is a surface having a refractive power.

5. An optical apparatus as claimed in claim 1, wherein the deflecting means is a diffractive optical element.

6. An optical apparatus as claimed in claim 1, wherein the deflecting means is a wedge-shaped prism.

7. An optical apparatus as claimed in claim 1, wherein the light beam selecting surface has an optical power and exerts the optical power both when it transmits a light beam and when it reflects a light beam.

8. An image forming apparatus comprising:
   an illumination light source for emitting an illumination light beam;
   a reflective type spatial light modulator for selectively reflecting the illumination light beam so as to modulate the illumination light beam into an image-carrying light beam;
   a light beam selecting surface for selectively reflecting the illumination light beam according to an angle of incidence at which the illumination light beam strikes the light beam selecting surface; and
   deflecting means disposed between the reflective type spatial light modulator and the light beam selecting surface so as to deflect at least one of the illumination light beam and the image-carrying light beam,
      wherein the illumination light beam is reflected from or transmitted through the light beam selecting surface so as to be shone, through the deflecting means, on the reflective type spatial light modulator, and is then selectively reflected by the reflective type spatial light modulator so as to be modulated into the image-carrying light beam, which is then shone, through the deflecting means again, on the light beam selecting surface so as to be transmitted therethrough or reflected therefrom according to whether the illumination light has been reflected therefrom or transmitted therefrom, respectively.

9. An image forming apparatus as claimed in claim 8, wherein the deflecting means has a positive optical power.

10. An image forming apparatus as claimed in claim 8, wherein the light beam selecting surface acts on both the illumination light beam and the image-carrying light beam.

11. An image forming apparatus as claimed in claim 8, wherein the deflecting means is a surface having a refractive power.

12. An image forming apparatus as claimed in claim 8, wherein the deflecting means is a diffractive optical element.

13. An image forming apparatus as claimed in claim 8, wherein the deflecting means is a wedge-shaped prism.

14. An image forming apparatus as claimed in claim 8, wherein the light beam selecting surface has an optical power and exerts the optical power both when it transmits a light beam and when it reflects a light beam.

15. An image observation apparatus comprising:
   an image forming apparatus having:
      an illumination light source for emitting an illumination light beam;
      a reflective type spatial light modulator for selectively reflecting the illumination light beam so as to modulate the illumination light beam into an image-carrying light beam;
      a light beam selecting surface for selectively reflecting the illumination light beam according to an angle of incidence at which the illumination light beam strikes the light beam selecting surface; and
      deflecting means disposed between the reflective type spatial light modulator and the light beam selecting surface so as to deflect at least one of the illumination light beam and the image-carrying light beam,
         wherein the illumination light beam is reflected from or transmitted through the light beam selecting surface so as to be shone, through the deflecting means, on the reflective type spatial light modulator, and is then selectively reflected by the reflective type spatial light modulator so as to be modulated into the image-carrying light beam, which is then shone, through the deflecting means again, on the light beam selecting surface so as to be transmitted therethrough or reflected therefrom according to whether the illumination light has been reflected therefrom or transmitted therefrom, respectively; and
   an observation optical system for directing an image formed by the image forming apparatus to an eye of an observer.

16. An image projection apparatus comprising:
   an image forming apparatus having:
      an illumination light source for emitting an illumination light beam;

a reflective type spatial light modulator for selectively reflecting the illumination light beam so as to modulate the illumination light beam into an image-carrying light beam;

a light beam selecting surface for selectively reflecting the illumination light beam according to an angle of incidence at which the illumination light beam strikes the light beam selecting surface; and deflecting means disposed between the reflective type spatial light modulator and the light beam selecting surface so as to deflect at least one of the illumination light beam and the image-carrying light beam, wherein the illumination light beam is reflected from or transmitted through the light beam selecting surface so as to be shone, through the deflecting means, on the reflective type spatial light modulator, and is then selectively reflected by the reflective type spatial light modulator so as to be modulated into the image-carrying light beam, which is then shone, through the deflecting means again, on the light beam selecting surface so as to be transmitted therethrough or reflected therefrom according to whether the illumination light has been reflected therefrom or transmitted therefrom, respectively; and a projection optical system for projecting an image formed by the image forming apparatus.

* * * * *